US012217236B2

United States Patent
Yang et al.

(10) Patent No.: US 12,217,236 B2
(45) Date of Patent: Feb. 4, 2025

(54) OVERLAP DETECTION FOR AN ITEM RECOGNITION SYSTEM

(71) Applicant: Maplebear Inc., San Francisco, CA (US)

(72) Inventors: Shiyuan Yang, Jersey City, NJ (US); Shray Chandra, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 134 days.

(21) Appl. No.: 17/726,389

(22) Filed: Apr. 21, 2022

(65) Prior Publication Data

US 2022/0343308 A1 Oct. 27, 2022

Related U.S. Application Data (60) Provisional application No. 63/177,937, filed on Apr. 21, 2021.

(51) Int. Cl.
*G06Q 20/20* (2012.01)
*G01G 19/414* (2006.01)
(Continued)

(52) U.S. Cl.
CPC ....... *G06Q 20/208* (2013.01); *G01G 19/4144* (2013.01); *G06Q 20/18* (2013.01);
(Continued)

(58) Field of Classification Search
CPC .................. G06V 10/16; G06V 10/70; G06T 2207/20081; G06T 2207/20084; G06Q 20/20
See application file for complete search history.

(56) References Cited

U.S. PATENT DOCUMENTS 6,646,659 B1 * 11/2003 Brown ................ G06Q 30/02
                                                                705/26.5
10,134,131 B1   11/2018 Ando et al.
(Continued)

FOREIGN PATENT DOCUMENTS

KR    2002061140 A  *  7/2002
KR    2019002072 A  *  1/2019  ....... G06K 19/06037
(Continued)

OTHER PUBLICATIONS

Zhang, Yifu et al. "FairMOT: On the Fairness of Detection and Re-Identification in Multiple Object Tracking." International journal of computer vision 129.11 (2021): 3069-3087. Web. (Year: 2021).*

(Continued)

*Primary Examiner* — Ashford S Hayles
(74) *Attorney, Agent, or Firm* — Fenwick & West LLP (57) ABSTRACT

An item recognition system uses a top camera and one or more peripheral cameras to identify items. The item recognition system may use image embeddings generated based on images captured by the cameras to generate a concatenated embedding that describes an item depicted in the image. The item recognition system may compare the concatenated embedding to reference embeddings to identify the item. Furthermore, the item recognition system may detect when items are overlapping in an image. For example, the item recognition system may apply an overlap detection model to a top image and a pixel-wise mask for the top image to detect whether an item is overlapping with another in the top image. The item recognition system notifies a user of the overlap if detected.

21 Claims, 8 Drawing Sheets

(51) Int. Cl.
*G06Q 20/18* (2012.01)
*G06T 7/10* (2017.01)
*G06T 7/50* (2017.01)
*G06V 10/10* (2022.01)
*G06V 10/22* (2022.01)
*G06V 10/70* (2022.01)
*G06V 10/94* (2022.01)
*G06V 20/60* (2022.01)
*G06V 20/64* (2022.01)
*G07G 1/00* (2006.01)
*H04N 23/90* (2023.01)

(52) U.S. Cl.
CPC ............... *G06T 7/10* (2017.01); *G06T 7/50* (2017.01); *G06V 10/16* (2022.01); *G06V 10/23* (2022.01); *G06V 10/70* (2022.01); *G06V 10/945* (2022.01); *G06V 20/60* (2022.01); *G06V 20/64* (2022.01); *G07G 1/0036* (2013.01); *H04N 23/90* (2023.01); *G06T 2200/24* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,664,722 | B1* | 5/2020 | Sharma | G06F 18/22 |
| 11,481,751 | B1* | 10/2022 | Chaubard | G06V 10/82 |
| 11,810,317 | B2* | 11/2023 | Fisher | H04W 4/029 |
| 2002/0029272 | A1* | 3/2002 | Weller | G06Q 10/06 709/226 |
| 2003/0126020 | A1* | 7/2003 | Smith | G06Q 30/02 705/16 |
| 2006/0224432 | A1* | 10/2006 | Li | G06Q 10/1095 705/7.19 |
| 2010/0312385 | A1* | 12/2010 | Deuber | G06Q 30/06 177/1 |
| 2012/0008830 | A1* | 1/2012 | Yoshii | G06T 7/74 382/103 |
| 2012/0095585 | A1* | 4/2012 | Agarwal | G06Q 10/103 700/109 |
| 2012/0226624 | A1* | 9/2012 | Song | G06Q 10/083 705/338 |
| 2015/0030219 | A1* | 1/2015 | Madabhushi | G06T 7/12 382/128 |
| 2017/0132466 | A1 | 5/2017 | Gousev et al. | |
| 2017/0369245 | A1* | 12/2017 | Suemitsu | B65G 1/1373 |
| 2018/0025460 | A1* | 1/2018 | Watanabe | G06Q 10/087 705/28 |
| 2018/0158016 | A1* | 6/2018 | Pandya | G05B 19/41895 |
| 2019/0108396 | A1* | 4/2019 | Dal Mutto | G06V 20/52 |
| 2020/0134855 | A1* | 4/2020 | Zucker | G06T 7/13 |
| 2021/0082564 | A1 | 3/2021 | Colachis et al. | |
| 2021/0407124 | A1* | 12/2021 | Hinek | G06T 7/194 |
| 2022/0036090 | A1* | 2/2022 | Migdal | G06T 7/269 |
| 2023/0079388 | A1* | 3/2023 | Fisher | G06V 20/52 382/103 |

FOREIGN PATENT DOCUMENTS

KR 101952777 B1 * 2/2019
WO WO-2019/019525 A1 1/2019

OTHER PUBLICATIONS

Chen, Zhiming et al. "PIoU Loss: Towards Accurate Oriented Object Detection in Complex Environments." Computer Vision—ECCV 2020. vol. 12350. Switzerland: Springer International Publishing AG, 2020. 195-211. Web. (Year: 2020).*
Bansal, Vaibhav et al. "re-OBJ: Jointly Learning the Foreground and Background for Object Instance Re-identification." International Conference on Image Analysis and Processing (2019). (Year: 2019).*
PCT Invitation to Pay Additional Fees, PCT Application No. PCT/US22/25819, Aug. 11, 2022, 2 pages.
PCT International Search Report and Opinion, PCT Application No. PCT/US22/25819, Oct. 5, 2022, 13 pages.
He, K., et al., "Mask R-CNN," Proceedings of the IEEE International Conference on Computer Vision (ICCV), Mar. 20, 2017, pp. 2961-2969.
Koehrsen, W., "Neural Network Embeddings Explained," Medium, Oct. 1, 2018, pp. 1-19.
The Mathworks, Inc. "concatenationLayer," Mar. 21, 2019, pp. 1-6, [Online] [Retrieved on Nov. 4, 2024] Retrieved from the Internet <URL: https://www.mathworks.com/help/deeplearning/ref/nnet.cnn.layer.concatenationlayer.html>.
United States Patent Office, Office Action, U.S. Appl. No. 17/726,385, filed Sep. 5, 2024, 14 pages.

* cited by examiner

OVERLAP DETECTION FOR AN ITEM RECOGNITION SYSTEM

CROSS REFERENCE TO RELATED APPLICATION

This application claims the benefit of U.S. Provisional Patent Application No. 63/177,937, entitled "Methods and Systems for Identifying Items Using Computer Vision" and filed on Apr. 21, 2021, which is hereby incorporated by reference herein in its entirety.

BACKGROUND

Conventional computer vision systems used for identifying items often use 3D image data that specifies depth information from the 3D camera to each pixel of the 3D image. This 3D image data is highly useful for computer vision models that identify the items depicted in the 3D image data. However, 3D cameras are typically more costly than traditional 2D cameras, since they require additional sensors for capturing 3D depth information.

Additionally, some computer vision systems that use computer vision models to identify items fail to correctly identify items when those items overlap or are too close to each other in an image. This issue arises because the machine-learning models fail to differentiate the items as separate items and the information related to one item may interfere with the identification of the other item. Thus, conventional computer vision systems often require the user to identify one item at a time or additional efforts by the user to determine how far apart items must be in order to be correctly identified together.

SUMMARY

In accordance with one or more aspects of the disclosure, an item recognition system identifies items placed in a receiving surface based on image data from a top camera and one or more peripheral cameras. The item recognition system accesses a top image captured by a top camera of the item recognition system. The top camera may be coupled to a top portion of the item recognition system. The item recognition system accesses one or more peripheral images captured by one or more peripheral cameras. The peripheral cameras may be coupled to side portions of the item recognition system. The top camera and the peripheral cameras may be coupled to the item recognition system such that the top camera and the peripheral cameras maintain fixed positions and orientations relative to each other.

The item recognition system identifies regions of the top image and the peripheral images that depict an item on a receiving surface of the item recognition system. The item recognition system may identify the regions by generating a pixel-wise mask for each of the images and generating bounding boxes for the images based on the pixel-wise masks. The item recognition system may use the bounding boxes to generate cropped images of the items based on the top image and the peripheral images.

The item recognition system generates image embeddings for each of the identified regions. The item recognition system may generate the image embeddings by applying an image embedding model to each of the identified regions. The item recognition system concatenates the image embeddings to generate a concatenated embedding for the item. The item recognition system concatenates the image embeddings based on a pre-determined ordering of the top camera and the peripheral cameras. The item recognition system identifies the item based on the concatenated embedding and reference embeddings. The reference embeddings are embeddings that are associated with an item identifier for a known item. The item recognition system may compare the concatenated embedding to the reference embeddings to generate similarity scores representing the similarity of the concatenated embedding to each of the reference embeddings, and may identify the item based on the similarity scores.

By using image data from a top camera and from one or more peripheral cameras, the item recognition system gains additional information about an item. Specifically, the item recognition system can use image data depicting the item from multiple views to identify the item. The item recognition system can thereby effectively identify the item based on less precise image data from less expensive cameras, such as 2D cameras rather than 3D cameras. Additionally, by concatenating the image embeddings based on a pre-determined ordering of the cameras of the item recognition system, the item recognition system ensures that the concatenated embedding retains information about which camera is associated with each image embedding that makes up the concatenated embedding. This allows the item recognition system to more effectively identify items.

Additionally, the item recognition system can detect when items are overlapping and notify the user of the overlapping items. The item recognition system accesses a top image captured by a top camera of the item recognition system. The top camera may be coupled to a top portion of the item recognition system. The item recognition system accesses one or more peripheral images captured by one or more peripheral cameras. The peripheral cameras may be coupled to side portions of the item recognition system. The top camera and the peripheral cameras may be coupled to the item recognition system such that the top camera and the peripheral cameras maintain fixed positions and orientations relative to each other.

The item recognition system generates a pixel-wise mask for the top image based on the top image. The pixel-wise mask indicates which portions of the top image depict an item. The item recognition system may generate the pixel-wise mask by applying a mask generation model to the top image. The item recognition system applies an overlap detection model to the top image, the peripheral images, and the pixel-wise mask to detect whether a first item overlaps with a second item. If the item recognition system detects an overlap, the item recognition system notifies a user of the item recognition system of the overlap. If the item recognition does not detect an overlap, the item recognition system identifies the first item and the second item.

By detecting whether items are overlapping, the item recognition system can alert a user when the item recognition system will likely have trouble identifying items that are placed in a receiving surface of the item recognition system. The user, therefore, does not have to be trained on how to arrange items on the receiving surface, and can instead simply move items apart from each other when the item recognition system detects that they are overlapping. Therefore, the item recognition system improves the user's ability to ensure accurate item identification without significant user training.

DETAILED DESCRIPTION

Figure 1A:
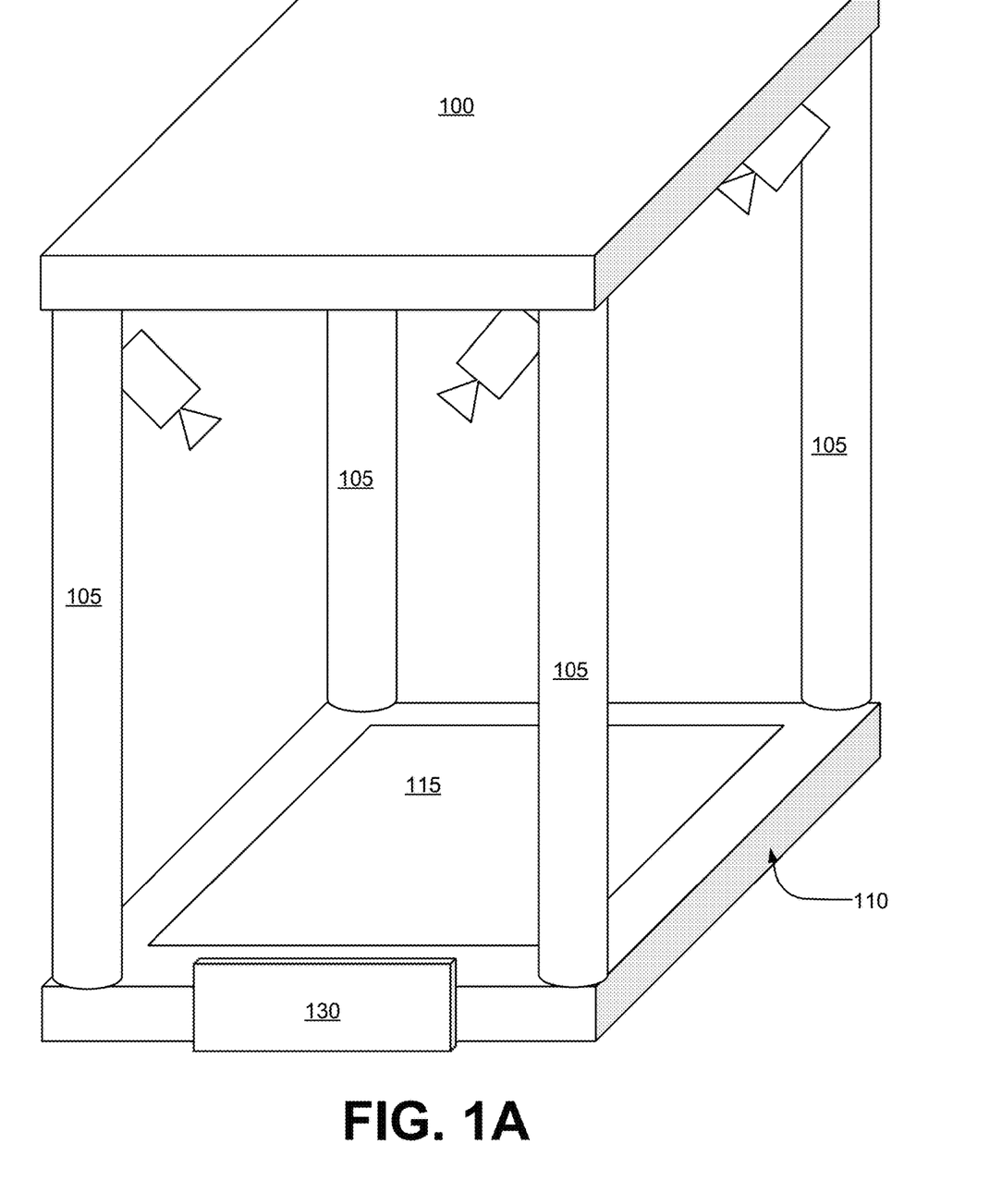
FIG. 1A illustrates an example item recognition system from a perspective view, in accordance with some embodiments.

FIG. 1A illustrates an example item recognition system from a perspective view, in accordance with some embodiments. Alternative embodiments may include more, fewer, or different components from those illustrated in FIG. 1, and the structure or function of each component may be different from that illustrated.

The item recognition system includes a top portion 100, one or more side portions 105, and a bottom portion 110. The top portion 100 may be coupled to the bottom portion 110 by the side portions 105. The side portions 105 may be structured as columns (as depicted) or as walls that enclose the space around a receiving surface 115. The receiving surface 115 is an area in which a user may place an item for recognition by the item recognition system. The receiving surface 115 may be made of a material that improves the ability of the item recognition system to recognize items in the receiving area. Similarly, the receiving surface 115 may have an appearance that improves the ability of the item recognition system to recognize items on the receiving surface 115. For example, the receiving surface 115 may have a solid color that is dissimilar to the color of many items that may be placed on the receiving surface 115. Similarly, the receiving surface 115 may have a high-contrast color or a geometric pattern (e.g., a checkerboard) that distinguishes the receiving surface 115 from items placed on the receiving surface 115. In some embodiments, the receiving surface 115 includes one or more sensors that detect whether an item has been placed on the receiving surface 115. For example, the receiving surface 115 may include one or more weight sensors that detect changes in a force applied to the receiving surface 115 to determine whether an item has been added.

The item recognition system includes one or more peripheral cameras 120. Each peripheral camera 120 is a device that captures image data of the receiving surface 115. A peripheral camera 120 may capture 2D image data of the receiving surface 115 and items on the receiving surface. The 2D image data may include images with a set of color channels (e.g., RGB) for each pixel in the image. In some embodiments, the peripheral cameras 120 capture 3D image data, where pixels in images captured by the peripheral cameras 120 include a channel that indicates a depth from the camera.

Figure 1B:
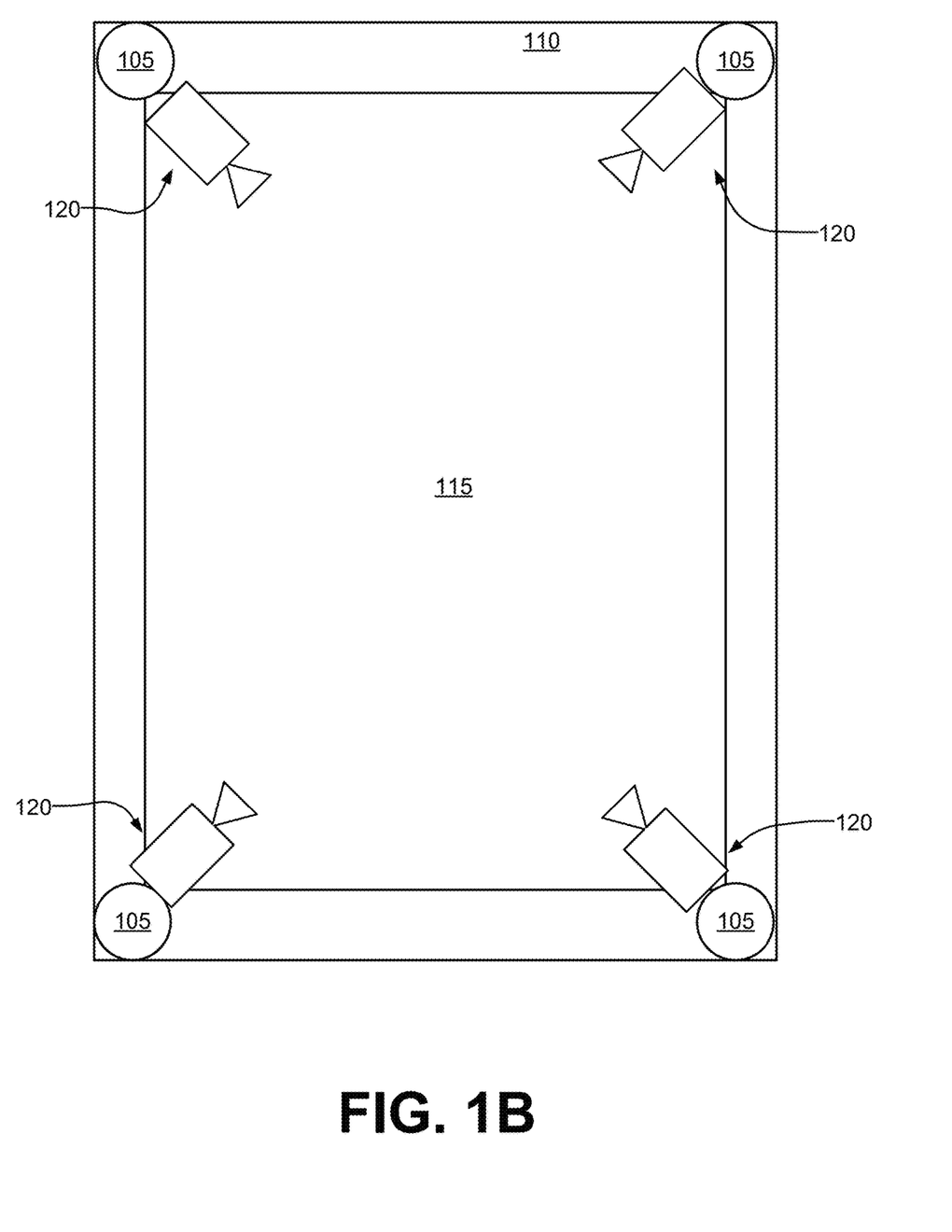
FIG. 1B illustrates a top-down view of an item recognition system, in accordance with some embodiments.

FIG. 1B illustrates a top-down view of an item recognition system, in accordance with some embodiments. The peripheral cameras 120 are configured to capture image data of the receiving surface 115 from different peripheral views. The peripheral cameras 120 may be configured such that image data captured from each of the peripheral cameras 120 depicts a combined complete view of the receiving surface 115 and items placed thereon.

Figure 1C:
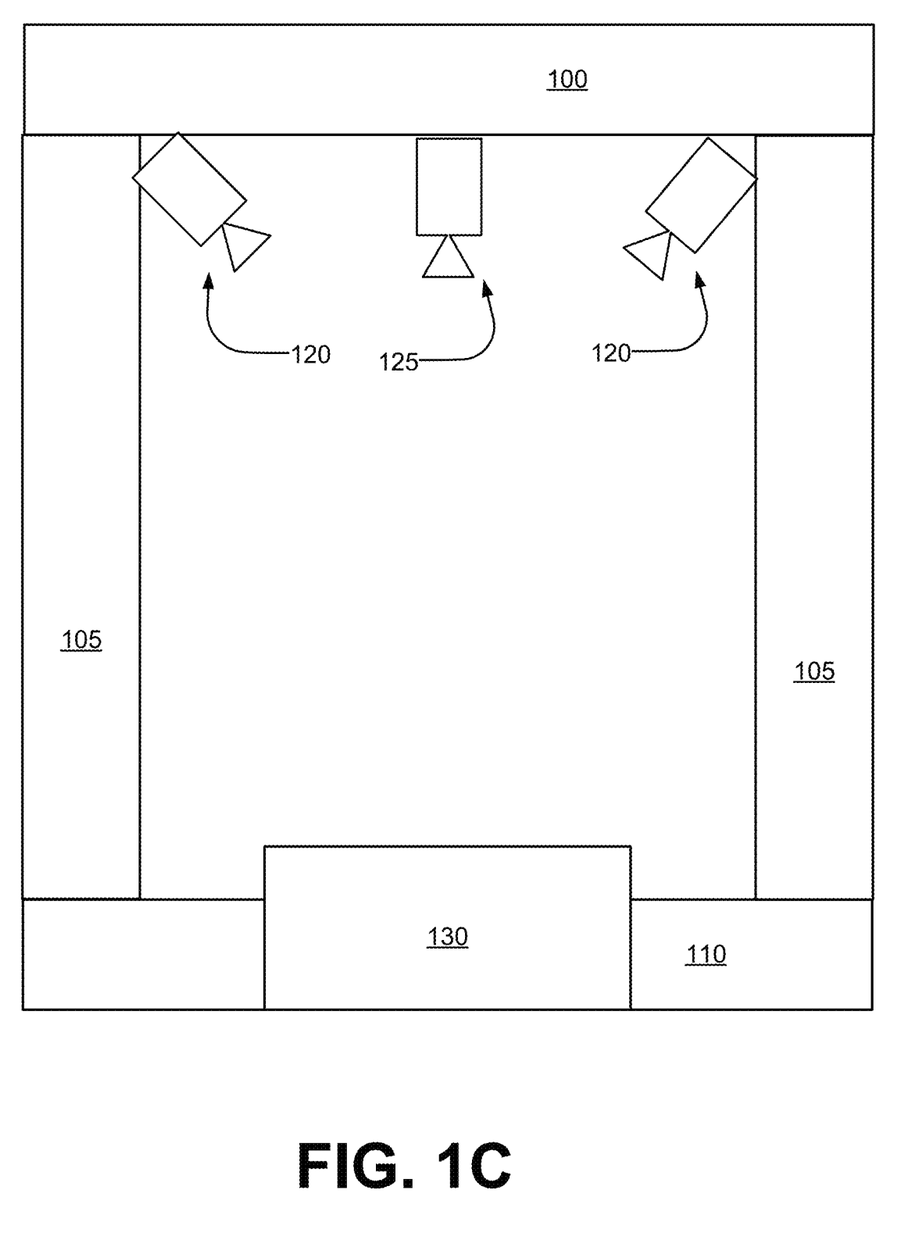
FIG. 1C illustrates a front-view of an item recognition system, in accordance with some embodiments.

FIG. 1C illustrates a front-view of an item recognition system, in accordance with some embodiments. The item recognition system includes a top camera 125. The top camera 125 is a device that captures image data of the receiving surface 115 from a top-down view. The top camera 125 may be a similar device to the peripheral cameras 120. The top camera 125 is coupled to the top portion 100 and may be positioned near the center of the top portion 100. However, the top camera 125 may be coupled to any portion of the item recognition system and may be positioned in any suitable location to capture images of items on the receiving surface 115. In some embodiments, the item recognition system does not include a top camera 125. For example, the item recognition system may recognize items placed on the receiving surface 115 based on peripheral images captured by peripheral cameras 120.

The item recognition system includes a user interface 130. The user interface 130 is a system that a user of the item recognition system can use to interact with the item recognition system. For example, the user interface 130 may include a display, a speaker, a microphone, a touch screen, a keypad, a keyboard, a mouse, a printer, a barcode scanner, or a payment interface.

The item recognition system may include additional components from those illustrated in FIGS. 1A-1C. For example, the item recognition system may include lights that illuminate the receiving surface 115. Additionally, the item recognition system may include a processor and a non-transitory, computer-readable medium that together provide functionality to the item recognition system that allow the item recognition system to identify items.

Figure 2:
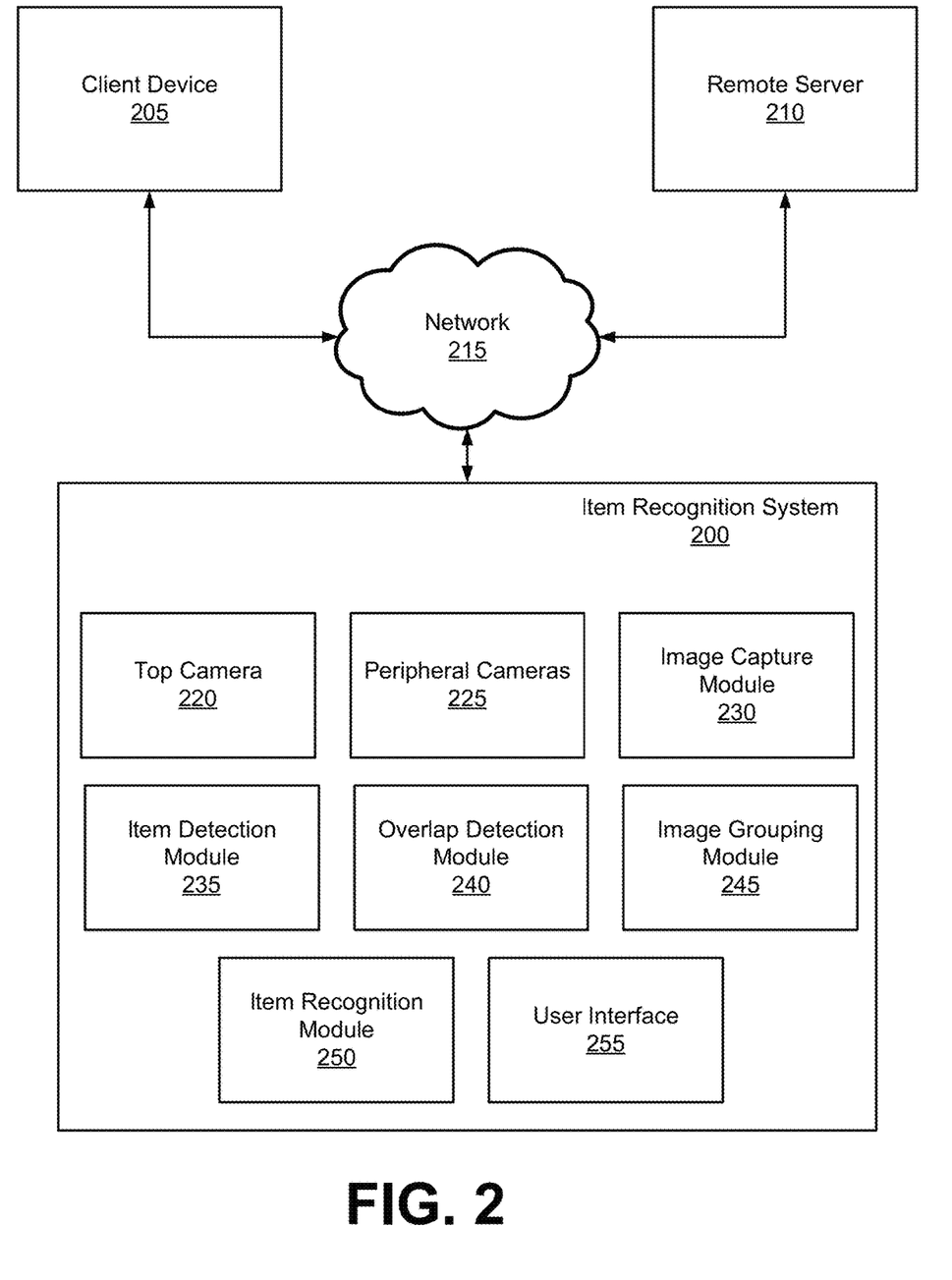
FIG. 2 illustrates an example system environment for an item recognition system, in accordance with some embodiments.

FIG. 2 illustrates an example system environment for an item recognition system 200, in accordance with some embodiments. The system environment illustrated in FIG. 2 includes the item recognition system 200, a client device 205, a remote server 210, and a network 215. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

A user may interact with the item recognition system 200 through a separate client device 205. The client device 205 can be a personal or mobile computing device, such as a smartphone, tablet, laptop computer, or desktop computer. In some embodiments, the client device 205 executes a client application that uses an application programming interface (API) to communicate with the item recognition system 200 through the network 205. A user may use the client device 205 to provide instructions to the item recognition system 200 to capture image data of items placed on the receiving surface of the item recognition system 200. In embodiments where the item recognition system 200 is part of an automated checkout system, the user may use the client device 205 to complete a checkout or payment process.

The item recognition system 200 may communicate with a remote server 210 while recognizing items. In some arrangements, some or all of the functionality of the item recognition system 200 described below may be performed by the remote server 210. For example, the item recognition system 200 may transmit image data captured by cameras of the item recognition system 200 to the remote server 210 and the remote server 210 may transmit an item identifier to the item recognition system 200 for each item depicted in the image data. In some embodiments, the remote server 210 stores a database of reference embeddings and item identifiers associated with the reference embeddings. The item recognition system 200 may request some or all of the reference embeddings stored by the remote server 210 to be used as candidate reference embeddings when the item recognitions system 200 identifies items.

The item recognition system 200 communicates with the client device 205 or the remote server 210 via the network 215, which may comprise any combination of local area and wide area networks employing wired or wireless communication links. In some embodiments, the network 215 uses standard communications technologies and protocols. For example, the network 215 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 215 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 215 may be represented using any format, such as hypertext markup language (HTML) or extensible markup language (XML). In some embodiments, all or some of the communication links of the network 215 may be encrypted.

The item recognition system 200 is a system that recognizes items placed on a receiving surface of the item recognition system 200. FIG. 2 also illustrates an example system architecture of an item recognition system 200, in accordance with some embodiments. The item recognition system 200 illustrated in FIG. 2 includes a top camera 220 (such as the top camera 125 of FIGS. 1A-1C), one or more peripheral cameras 225 (such as the peripheral cameras 120 of FIGS. 1A-1C), an image capture module 230, an item detection module 235, an overlap detection module 240, an image grouping module 245, an item recognition module 250, and a user interface 255 (such as the user interface 130 of FIGS. 1A-1C). Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The image capture module 230 instructs the top camera 220 and the peripheral cameras 225 to capture images of a receiving surface of the item recognition system 200. The top camera 220 captures a top image of the receiving surface and the peripheral cameras 225 capture peripheral images of the receiving surface. The image capture module 230 may instruct the top camera 220 and the peripheral cameras 225 to continually capture image data (e.g., with a regular frequency) or may instruct the top camera 220 and the peripheral cameras 225 to capture image data in response to detecting an item is placed on the receiving surface (e.g., based on sensor data from weight sensors of the receiving surface).

The item detection module 235 identifies the presence of items on the receiving surface based on top images and peripheral images captured by the top camera 220 and the peripheral cameras 225. The item detection module 235 may generate a pixel-wise mask for images generated by the cameras. Each pixel-wise mask is an array of binary values that identifies whether a pixel includes an item. For example, pixels of the image that include an item may be set to "1" and pixels of the image that do not include an item may be set to "0." Where an image depicts multiple items, the item detection module 235 may generate a single pixel-wise mask may indicate which pixels depict any item of the multiple items. Alternatively, the item detection module 235 may generate a separate pixel-wise mask for each contiguous region of pixels that include an item.

To generate the pixel-wise mask for an image, the item detection module 235 may apply a mask generation model to the top image and the peripheral images. A mask generation model is a machine-learning model (e.g., a neural network) that is trained to generate pixel-wise masks for images. The mask generation model may include a convolutional neural network (e.g., MaskRCNN). The mask generation model may be trained based on a set of training examples. Each training example may include an image depicting one or more items and a label that indicates a ground-truth pixel-wise mask for the image. The mask generation model may be iteratively trained based on each of the training example, where weights used by the mask generation model are updated through a backpropagation process based on a loss function.

The item detection module 235 also generates bounding boxes for items in top images and peripheral images based on pixel-wise masks. The bounding boxes identify regions of the top images and peripheral images that depict items. The item detection module 235 may generate bounding boxes by identifying a smallest rectangular (or other shaped) region of an image that encloses a contiguous region of pixels where an item is depicted. In some embodiments, the bounding boxes are generated by a bounding box model, which is a machine-learning model (e.g., a neural network) that is trained to generate bounding boxes for items in images based on pixel-wise masks for the images. The bounding box model and the mask generation model may be the same machine-learning model, which is trained to generate both pixel-wise masks and bounding boxes.

Figure 3:
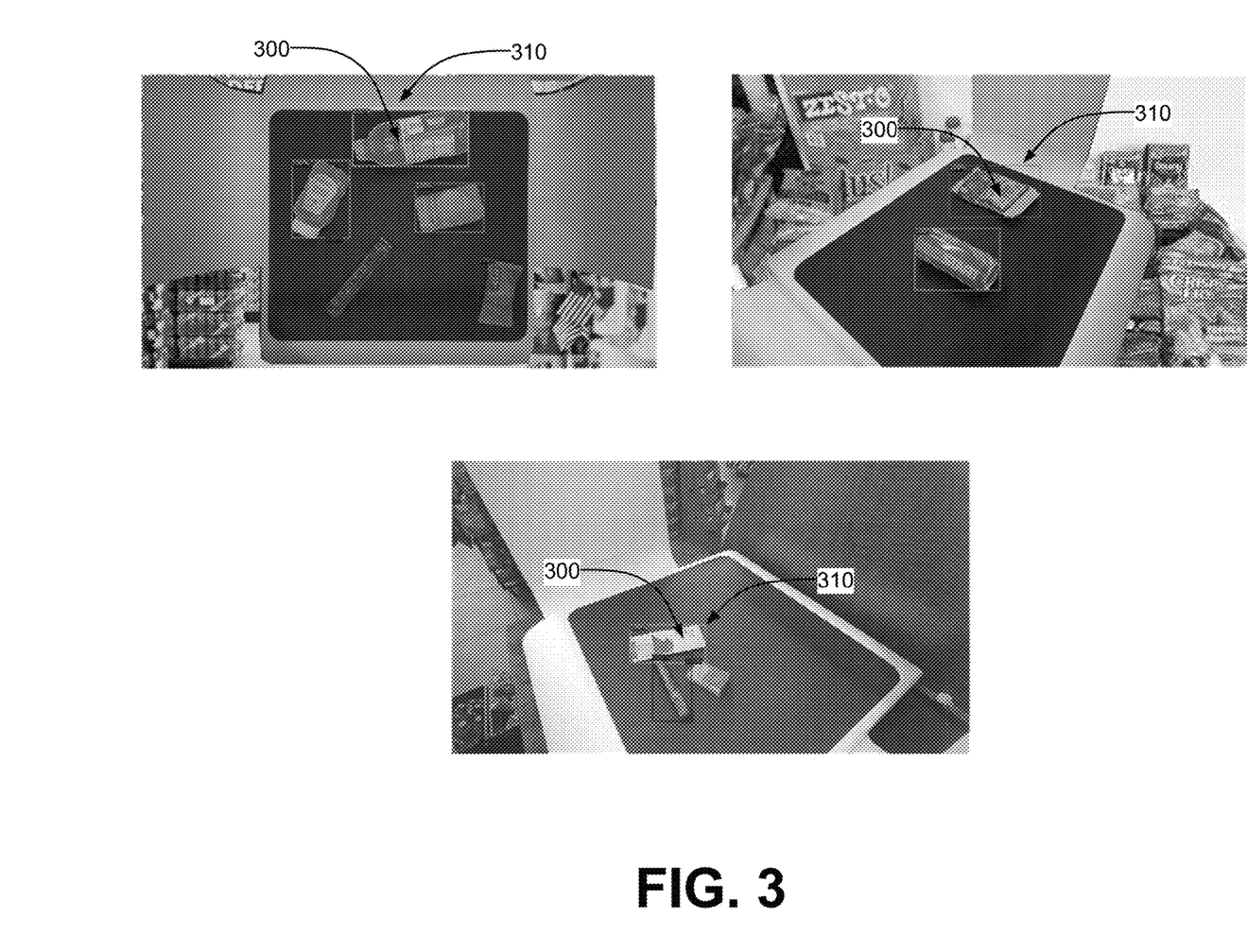
FIG. 3 illustrates some example pixel-wise masks and bounding boxes on images of items, in accordance with some embodiments.

FIG. 3 illustrates some example pixel-wise masks 300 and bounding boxes 310 on images of items, in accordance with some embodiments.

The item detection module 235 may use the generated bounding boxes to generate cropped images of items. A cropped image of an item is an image that is generated from a portion of a top image or a peripheral image based on a bounding box generated for that image. For example, a cropped image may be the region of a top image that is bounded by a bounding box generated by the item detection module 235.

The overlap detection module 240 detects whether an item is overlapping or occluded by another item in an image based on pixel-wise masks generated by the item detection module 235. The overlap detection module 240 uses an overlap detection model to detect an overlap of items in the top image. An overlap detection model is a machine-learning model that is trained to detect whether an image depicts an item that is overlapping another item based on the image and a pixel-wise mask for the image. For example, the overlap detection module may use a convolutional network to detect item overlaps in images. In some embodiments, the overlap detection module 240 detects overlapping items in a top image from the top camera 220 based on the top image and peripheral images from the peripheral cameras. For example, the overlap detection module 240 may receive the top image, the peripheral images, and their corresponding pixel-wise masks, and may detect whether an item is overlapping another item in the top image. The overlap detection model may be trained to detect item overlap in the top image based on the top image, the peripheral image, and their corresponding pixel-wise masks.

In some embodiments, the overlap detection module 240 uses a masked image to detect overlap. A masked image for an image is a modified version of the image where an additional channel is added to each pixel. The additional channel is the corresponding pixel value of the pixel-wise mask associated with the image. The overlap detection model may be trained to identify overlapping items in masked images. For example, the overlap detection model may be trained based on a set of training examples. Each training example may include a masked image and a label indicating whether the masked image depicts items overlapping.

The overlap detection module 240 also may extrapolate depth data from 2D top images and 2D peripheral images to detect overlapping items. The overlap detection module 240 may use a depth estimation model to estimate the depth at each pixel of a top image. A depth estimation model is a machine-learning model (e.g., a neural network) that is trained to determine a depth value for each pixel of a top image based on the top image and the peripheral images. The depth estimation model also may use the pixel-wise masks of images to generate depth values for pixels of the top image.

The overlap detection module 240 may use the depth values for the top image to detect overlapping items in the top image. For example, the overlap detection module 240 may apply the overlap detection model to the top image and its depth values to detect overlapping items. In these embodiments, the overlap detection model is trained to detect overlapping items based on depth values of a top image.

In some embodiments, the overlap detection module 240 detects overlapping items based on weight sensor data captured by weight sensors coupled to the receiving surface of the item recognition system. For example, the overlap detection module 240 may compare the measured weight of items on the receiving surface to the expected weight of items detected by the item recognition module 250. If there is a mismatch between the measured weight and the expected weight, then the overlap detection module 240 may determine that there are overlapping items on the receiving surface.

If the overlap detection module 240 detects that an item is overlapping with another time, the overlap detection module 240 notifies a user of the overlap through the user interface 255. For example, the overlap detection module 240 may instruct the user interface 255 to display a warning message to a user or to play an alert sound. In embodiments where the item recognition system 200 is used for an automated checkout, the overlap detection module 240 may prevent a user from finalizing a checkout process while item overlap is detected.

The image grouping module 245 identifies cropped images from a top image and peripheral images that correspond to the same item for each item placed in the receiving surface of the item recognition system 200. To identify cropped images that correspond to the same item, the image grouping module 245 identifies pixel regions of pixel-wise masks that correspond to each other. A pixel region is a contiguous set of pixels in a pixel-wise mask that indicate that an item is included at those pixels. The image grouping module 245 determines which pixel regions of each pixel-wise mask correspond to each other. If only one item is present, each pixel-wise mask likely only contains a single pixel region, and thus the problem becomes relatively straightforward of just associating the pixel region of each pixel-wise mask with the others. Where more than one item is present, each pixel-wise mask likely contains more than one pixel region, and the image grouping module 245 determines which pixel region in each pixel-wise mask corresponds to the other pixel regions.

The image grouping module 245 may spatially correlate the pixel regions of each pixel-wise mask, meaning the image grouping module 245 may determine pixel regions likely represent the same region of space within the item recognition system 200. For example, the image grouping module 245 may generate a projection of the pixel-wise masks of the top image and the peripheral images based on positions of the top camera 220 and the peripheral cameras 225 to determine which pixel regions may represent the same region of space within the item recognition system 200. The image grouping module 245 also may use a spatial grouping model that maps pixels of each pixel-wise mask to each other. For example, the spatial grouping model may be a fixed perspective geometric transform based on a point cloud or a homography.

The image grouping module 245 may use the spatially grouped pixel regions to identify cropped images that correspond to the same item. For example, the image grouping module 245 may identify, for each cropped image, which pixel region of which pixel-wise mask the cropped image corresponds to. The image grouping module 245 groups cropped images together that correspond to pixel regions that are spatially grouped together, and thereby determines that the grouped cropped images correspond to the same item on the receiving surface.

The item recognition module 250 identifies items depicted by top images from the top camera 220 and peripheral images from the peripheral cameras 225. The item recognition module 250 identifies an item based on the cropped images corresponding to the item from a top image and peripheral images. For example, the item recognition module 250 may generate an image embedding for each cropped image associated with an item. An image embedding is an embedding for a cropped image that describes characteristics of the cropped image and the item represented by the cropped image. The item recognition module 250 may generate the item embedding for each cropped image by applying an image embedding model to each cropped image. The image embedding model is a machine-learning model that is trained to generate an image embedding based on a cropped image of an item. For example, the image embedding model may be trained based on a set of training examples, where each training example includes a cropped image and a label identifying the object depicted in the cropped image. The image embedding model may be trained based on these training examples by training the image embedding model as a classifier based on the training examples, and using an intermediate layer of that classifier model to generate image embeddings. Additionally or alternatively, a image embedding model may be trained using an unsupervised approach (e.g., where different sets of different types of items may be used during a training process to teach the model to recognize the different types of items).

The item recognition module 250 generates a concatenated embedding for the item based on the image embeddings. A concatenated embedding is an embedding that is a concatenation of the image embeddings generated based on the cropped images. The item recognition module 250 concatenates the image embeddings based on a pre-determined ordering of the cameras of the item recognition system 200. The pre-determined ordering is an ordering of the cameras of the item recognition system 200 that is used to consistently order image embeddings. The image embeddings are ordered within the concatenated embedding based on the pre-determined ordering.

Figure 4:
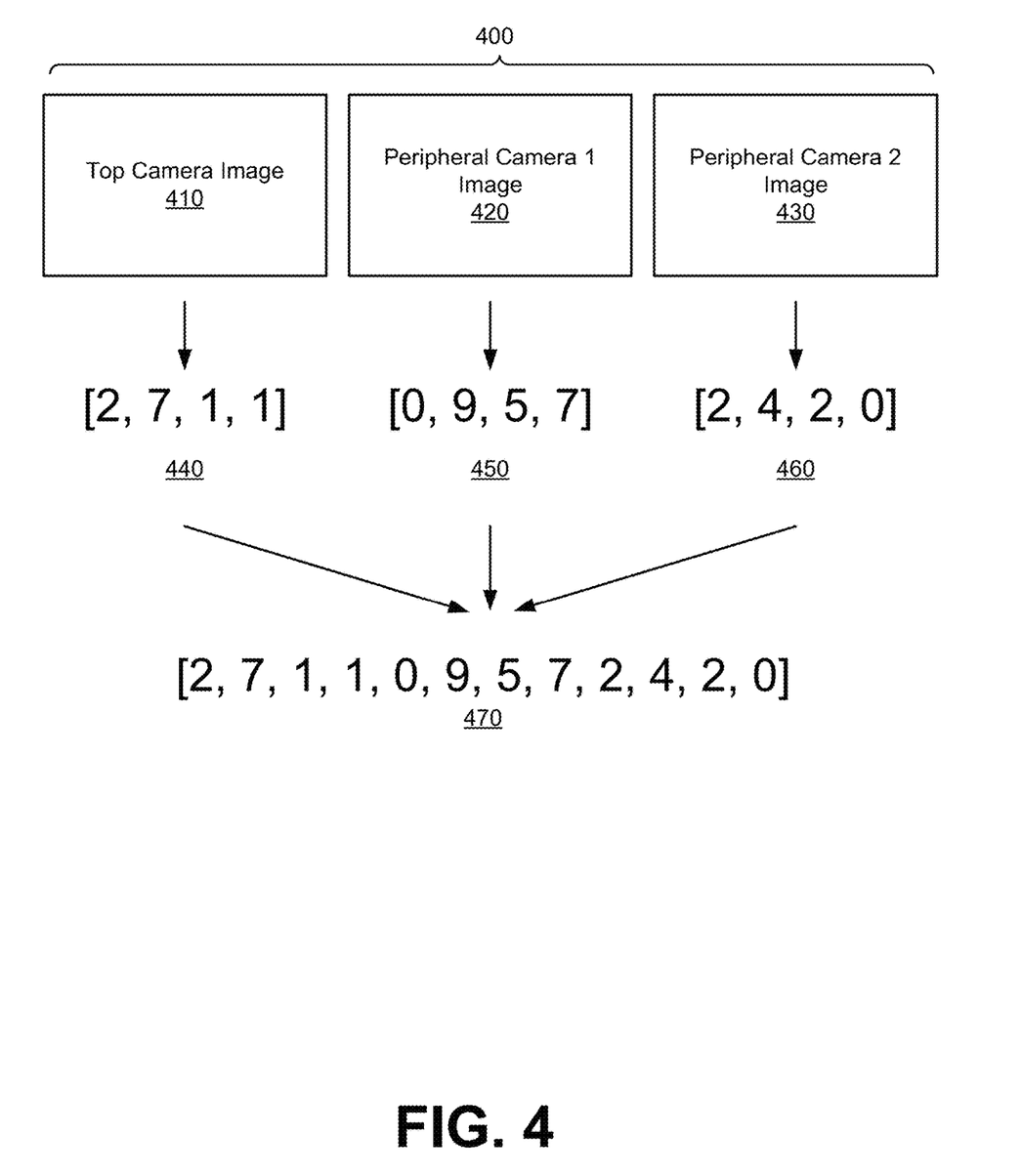
FIG. 4 illustrates an example concatenation of image embeddings to generate a concatenated embedding based on a pre-determined ordering of the cameras, in accordance with some embodiments.

FIG. 4 illustrates an example concatenation of image embeddings to generate a concatenated embedding based on a pre-determined ordering of the cameras, in accordance with some embodiments. The pre-determined ordering 400 illustrated in FIG. 4 is as follows: the top camera, peripheral camera 1, and peripheral camera 2. The item recognition module 250 generates an image embedding 440 for the cropped image 410 from the top camera, an image embedding 450 for the cropped image 420 for peripheral camera 1, and an image embedding 460 for the cropped image 430 for peripheral camera 2. For this pre-determined ordering 400, the item recognition module 250 generates a concatenated embedding 470 where the image embedding 440 from the top image 410 from the top camera 220 is listed first, then the image embedding 450 from the peripheral image 420 from peripheral camera 1, and then the image embedding 460 from the peripheral image 460 from peripheral camera 2.

The item recognition module 250 then compares the concatenated embedding generated for an item to reference embeddings. Reference embeddings are embeddings that represent items and are associated with item identifiers that identify the item. An item identifier may include a SKU or a PLU for an item. The item recognition module 250 may compare the concatenated embedding to the reference embeddings by applying a machine-learning model to the generated concatenated embedding and each of the reference embeddings to generate a similarity score between the concatenated embedding and each of the reference embeddings. Similarly, the item recognition module 250 may generate a similarity score between the concatenated embedding and each of the reference embeddings by calculating a Euclidean distance, a cosine distance, or a dot product of the concatenated embedding and each of the reference embeddings.

The item recognition module 250 identifies an item based on the similarity scores between the concatenated embedding generated for the item and the reference embeddings. For example, the item recognition module 250 may identify the item based on the reference embedding with the highest similarity score to the concatenated embedding. The item recognition module 250 may indicate the identified item to the user through the user interface 255. The item recognition module 250 also may present the item identifier to the user through the user interface 255. In embodiments where the item recognition system 200 is part of an automated checkout system, the item recognition system 200 may use the item identifier to add the item to a shopping list of the user.

Figure 5:
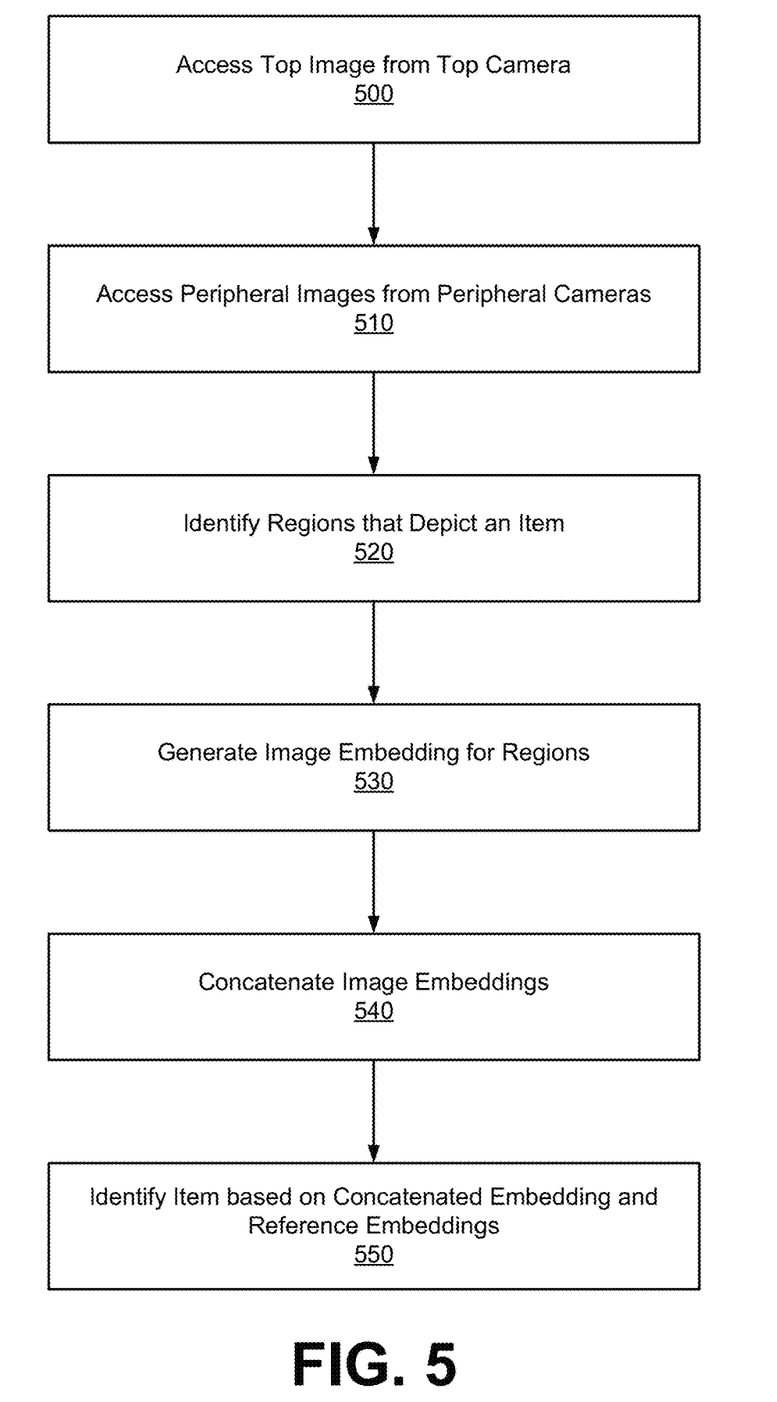
FIG. 5 is a flowchart for a method of identifying an item by an item recognition system, in accordance with some embodiments.

FIG. 5 is a flowchart for a method of identifying an item by an item recognition system, in accordance with some embodiments. Alternative embodiments may include more, fewer, or different steps from those illustrated in FIG. 5, and the steps may be performed in a different order from that illustrated in FIG. 5. Additionally, each of these steps may be performed automatically by the item recognition system without human intervention. In one or more arrangements, the steps illustrated in FIG. 5 may be performed by item recognition system 200.

The item recognition system accesses 500 a top image captured by a top camera of the item recognition system. The top camera may be coupled to a top portion of the item recognition system. The item recognition system accesses 510 one or more peripheral images captured by one or more peripheral cameras. The peripheral cameras may be coupled to side portions of the item recognition system. The top camera and the peripheral cameras may be coupled to the item recognition system such that the top camera and the peripheral cameras maintain fixed positions and orientations relative to each other.

The item recognition system identifies 520 regions of the top image and the peripheral images that depict an item on a receiving surface of the item recognition system. The item recognition system may identify the regions by generating a pixel-wise mask for each of the images and generating bounding boxes for the images based on the pixel-wise masks. The item recognition system may use the bounding boxes to generate cropped images of the items based on the top image and the peripheral images.

The item recognition system generates 530 image embeddings for each of the identified regions. The item recognition system may generate the image embeddings by applying an image embedding model to each of the identified regions. The item recognition system concatenates 540 the image embeddings to generate a concatenated embedding for the item. The item recognition system concatenates the image embeddings based on a pre-determined ordering of the top camera and the peripheral cameras. The item recognition system identifies 550 the item based on the concatenated embedding and reference embeddings. The reference embeddings are embeddings that are associated with an item identifier for a known item. The item recognition system may compare the concatenated embedding to the reference embeddings to generate similarity scores representing the similarity of the concatenated embedding to each of the reference embeddings, and may identify the item based on the similarity scores.

Figure 6:
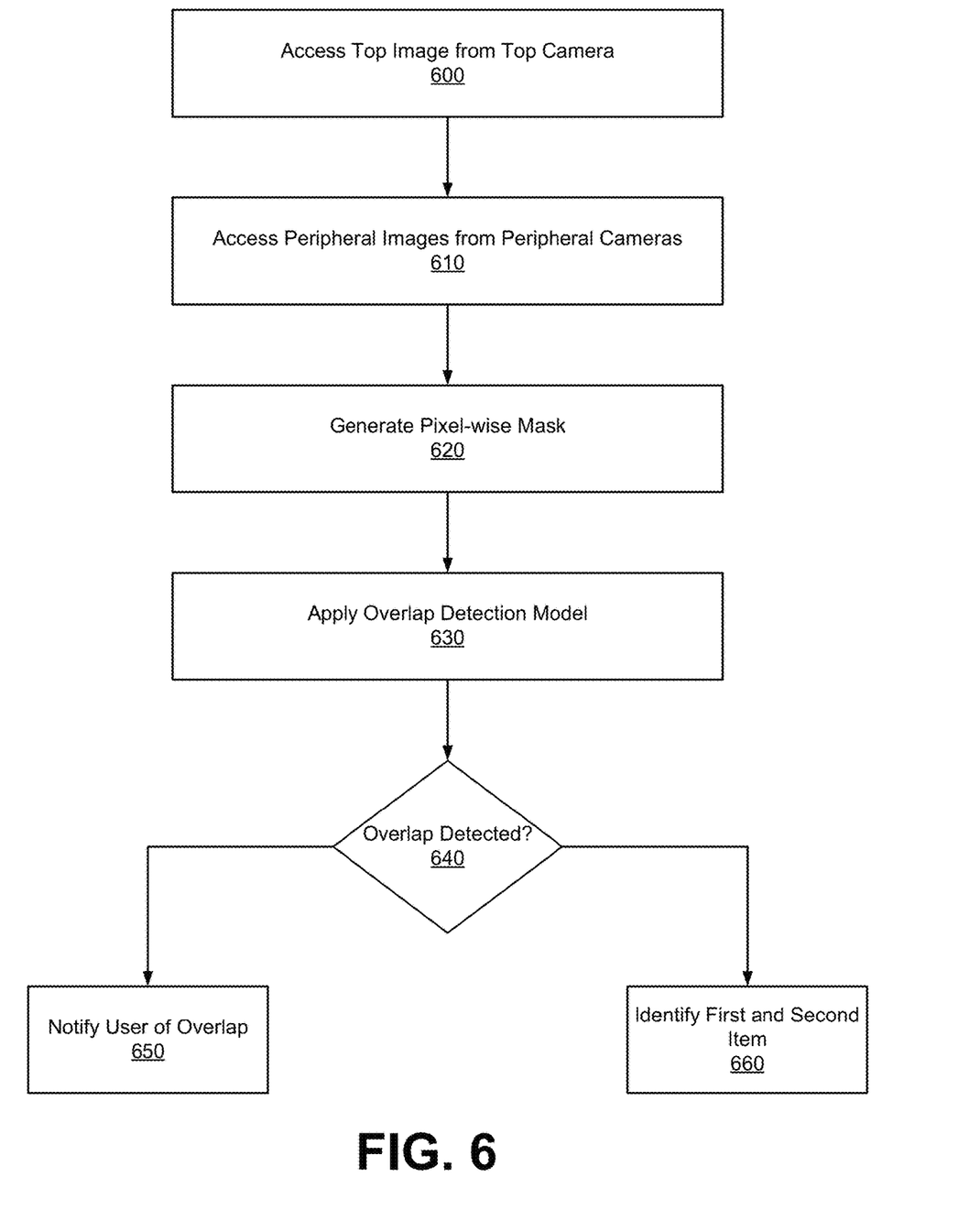
FIG. 6 is a flowchart for a method of detecting overlapping items by an item recognition system, in accordance with some embodiments.

FIG. 6 is a flowchart for a method of detecting overlapping items by an item recognition system, in accordance with some embodiments. Alternative embodiments may include more, fewer, or different steps from those illustrated in FIG. 6, and the steps may be performed in a different order from that illustrated in FIG. 6. Additionally, each of these steps may be performed automatically by the item recognition system without human intervention. In one or more arrangements, the steps illustrated in FIG. 6 may be performed by item recognition system 200.

The item recognition system accesses 600 a top image captured by a top camera of the item recognition system. The top camera may be coupled to a top portion of the item recognition system. The item recognition system accesses 610 one or more peripheral images captured by one or more peripheral cameras. The peripheral cameras may be coupled to side portions of the item recognition system. The top camera and the peripheral cameras may be coupled to the item recognition system such that the top camera and the peripheral cameras maintain fixed positions and orientations relative to each other.

The item recognition system generates 620 a pixel-wise mask for the top image based on the top image. The pixel-wise mask indicates which portions of the top image depict an item. The item recognition system may generate the pixel-wise mask by applying a mask generation model to the top image. The item recognition system applies 630 an overlap detection model to the top image, the peripheral images, and the pixel-wise mask to detect 640 whether a first item overlaps with a second item. If the item recognition system detects an overlap, the item recognition system notifies 650 a user of the item recognition system of the overlap. If the item recognition does not detect an overlap, the item recognition system identifies 660 the first item and the second item.

Additional Considerations

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. An item recognition system comprising:
   a receiving surface;
   a top camera coupled to a top portion of the item recognition system, wherein the top camera is configured to capture images of the receiving surface from a top-down view;
   one or more peripheral cameras coupled to one or more side portions of the item recognition system, wherein the one or more peripheral cameras are configured to capture images of the receiving surface from different peripheral views;
   a user interface;
   a processor; and
   a non-transitory, computer-readable medium storing instructions that, when executed by the processor, cause the processor to:

access a top image comprising an image captured by the top camera, wherein the top image depicts a first item and a second item on the receiving surface;

access one or more peripheral images, each comprising an image captured by a peripheral camera of the one or more peripheral cameras;

generate a pixel-wise mask for the top image based on the top image, wherein pixel-wise mask indicates one or more portions of the top image where an item is depicted;

apply an overlap detection model to the top image, the one or more peripheral images, and the pixel-wise mask to detect whether the first item overlaps with the second item, wherein the overlap detection model is a machine-learning model trained to detect overlapping items in top images based on the top images, peripheral images, and pixel-wise masks of the top images; and responsive to detecting that the first item overlaps with the second item, present a notification of the overlap through the user interface.

2. The item recognition system of claim 1, wherein the top camera and the one or more peripheral cameras are configured to capture 2D images of the receiving surface.

3. The item recognition system of claim 1, wherein the computer-readable medium further stores instructions that cause the processor to:

generate a masked image for the top image based on the top image and the pixel-wise mask for the top image; and apply the overlap detection model to the masked image.

4. The item recognition system of claim 1, wherein the computer-readable medium further stores instructions that cause the processor to:

generate a depth value for each pixel of the top image based on the top image and the one or more peripheral images; and apply the overlap detection model to the generated depth values of the top image.

5. The item recognition system of claim 1, wherein the computer-readable medium further stores instructions that cause the processor to:

responsive to not detecting that the first item overlaps with the second item, identifying the first item and the second item based on the top image, the one or more peripheral images, and the pixel-wise mask.

6. The item recognition system of claim 1, wherein the computer-readable medium further stores instructions that cause the processor to:

detect that the first item no longer overlaps with the second item based on a subsequent top image, a subsequent one or more peripheral images, and a subsequent pixel-wise mask.

7. The item recognition system of claim 1, wherein the instructions for notifying the user of the overlap further comprise instructions that cause the processor to:

display a message on a display of the user interface notifying the user of the overlap.

8. The item recognition system of claim 1, wherein the pixel-wise mask comprises a set of binary values that indicate which pixels of the top image include the first item or the second item.

9. The item recognition system of claim 1, wherein the receiving surface comprises a weight sensor configured to capture weight sensor data describing a weight of items placed on the receiving surface, and wherein the computer-readable medium further stores instructions that, when executed by the processor, cause the processor to:

access weight sensor data captured by the weight sensor, wherein the weight sensor data describes a weight of the first item and the second item; and apply the overlap detection model to the weight sensor data to detect whether the first item overlaps with the second item.

10. The item recognition system of claim 1, wherein the computer-readable medium further stores instructions that cause the processor to:

apply the overlap detection model to the one or more peripheral images to detect whether the first item overlaps with the second item in the one or more peripheral images.

11. A non-transitory, computer-readable medium storing instructions that, when executed by a processor, cause the processor to:

access a top image comprising an image captured by a top camera of an item recognition system, wherein the top image depicts a first item and a second item on a receiving surface of the item recognition system;

access one or more peripheral images, each comprising an image captured by a peripheral camera of one or more peripheral cameras of the item recognition system;

generate a pixel-wise mask for the top image based on the top image, wherein pixel-wise mask indicates one or more portions of the top image where an item is depicted;

apply an overlap detection model to the top image, the one or more peripheral images, and the pixel-wise mask to detect whether the first item overlaps with the second item, wherein the overlap detection model is a machine-learning model trained to detect overlapping items in top images based on the top images, peripheral images, and pixel-wise masks of the top images; and responsive to detecting that the first item overlaps with the second item, present a notification of the overlap through a user interface of the item recognition system.

12. The computer-readable medium of claim 11, wherein the top camera and the one or more peripheral cameras are configured to capture 2D images of the receiving surface.

13. The computer-readable medium of claim 11, further storing instructions that cause the processor to:

generate a masked image for the top image based on the top image and the pixel-wise mask for the top image; and apply the overlap detection model to the masked image.

14. The computer-readable medium of claim 11, further storing instructions that cause the processor to:

generate a depth value for each pixel of the top image based on the top image and the one or more peripheral images; and apply the overlap detection model to the generated depth values of the top image.

15. The computer-readable medium of claim 11, further storing instructions that cause the processor to:

responsive to not detecting that the first item overlaps with the second item, identifying the first item and the second item based on the top image, the one or more peripheral images, and the pixel-wise mask.

16. The computer-readable medium of claim 11, further storing instructions that cause the processor to:

detect that the first item no longer overlaps with the second item based on a subsequent top image, a subsequent one or more peripheral images, and a subsequent pixel-wise mask.

17. The computer-readable medium of claim 11, wherein the instructions for notifying the user of the overlap further comprise instructions that cause the processor to:

display a message on a display of the user interface notifying the user of the overlap.

18. The computer-readable medium of claim 11, wherein the pixel-wise mask comprises a set of binary values that indicate which pixels of the top image include the first item or the second item.

19. The computer-readable medium of claim 11, further storing instructions that cause the processor to:

access weight sensor data captured by a weight sensor coupled to the receiving surface, wherein the weight sensor is configured to capture weight sensor data describing a weight of items placed on the receiving surface; and apply the overlap detection model to the weight sensor data to detect whether the first item overlaps with the second item.

20. A method comprising:

accessing a top image comprising an image captured by a top camera of an item recognition system, wherein the top image depicts a first item and a second item on a receiving surface of the item recognition system;

accessing one or more peripheral images, each comprising an image captured by a peripheral camera of one or more peripheral cameras of the item recognition system;

generating a pixel-wise mask for the top image based on the top image, wherein pixel-wise mask indicates one or more portions of the top image where an item is depicted;

applying an overlap detection model to the top image, the one or more peripheral images, and the pixel-wise mask to detect whether the first item overlaps with the second item, wherein the overlap detection model is a machine-learning model trained to detect overlapping items in top images based on the top images, peripheral images, and pixel-wise masks of the top images; and responsive to detecting that the first item overlaps with the second item, presenting a notification of the overlap through a user interface of the item recognition system.

21. The system of claim 5, wherein the computer-readable medium further stores instructions that cause the processor to:

responsive to identifying the first item and the second item, completing a checkout process based on a first identifier associated with the first item and a second identifier associated with the second item.

* * * * *